US009637677B2

(12) United States Patent
Talley

(10) Patent No.: US 9,637,677 B2
(45) Date of Patent: May 2, 2017

(54) AQUEOUS CLEANING COMPOSITION AND METHOD

(71) Applicant: Ideal Energy Solutions IP Control, LLC, Lafayette, LA (US)

(72) Inventor: Charles Bullick Talley, Aurora, CO (US)

(73) Assignee: IDEAL ENERGY SOLUTIONS IP CONTROL, LLC, Lafayette, LA (US)

( * ) Notice: Subject to any disclaimer, the term of this patent is extended or adjusted under 35 U.S.C. 154(b) by 0 days.

(21) Appl. No.: 14/477,289

(22) Filed: Sep. 4, 2014

(65) Prior Publication Data
US 2016/0068741 A1 Mar. 10, 2016

(51) Int. Cl.
| | | |
|---|---|---|
| *C11D 1/72* | (2006.01) | |
| *C11D 3/08* | (2006.01) | |
| *C11D 3/06* | (2006.01) | |
| *C11D 3/395* | (2006.01) | |
| *C09K 8/524* | (2006.01) | |
| *C11D 3/10* | (2006.01) | |
| *C11D 3/39* | (2006.01) | |
| *C11D 11/00* | (2006.01) | |
| *C11D 1/825* | (2006.01) | |
| *C11D 1/83* | (2006.01) | |
| *C11D 3/33* | (2006.01) | |
| *C11D 1/66* | (2006.01) | |
| *C11D 1/14* | (2006.01) | |
| *C11D 1/24* | (2006.01) | |
| *C11D 1/74* | (2006.01) | |
| *C09K 8/584* | (2006.01) | |

(52) U.S. Cl.
CPC ............. *C09K 8/524* (2013.01); *C11D 1/825* (2013.01); *C11D 1/83* (2013.01); *C11D 3/06* (2013.01); *C11D 3/08* (2013.01); *C11D 3/10* (2013.01); *C11D 3/33* (2013.01); *C11D 3/3942* (2013.01); *C11D 11/0041* (2013.01); *C09K 8/584* (2013.01); *C11D 1/143* (2013.01); *C11D 1/24* (2013.01); *C11D 1/66* (2013.01); *C11D 1/667* (2013.01); *C11D 1/72* (2013.01); *C11D 1/74* (2013.01); *C11D 3/3945* (2013.01)

(58) Field of Classification Search
CPC .... C11D 1/14; C11D 1/16; C11D 1/72; C11D 1/88; C11D 1/94; C11D 3/06; C11D 3/08; C11D 3/10; C11D 3/046; C11D 3/2082; C11D 3/30; C11D 3/33; C11D 3/3942; C11D 3/3945
USPC ....... 510/188, 234, 238, 245, 254, 264, 421, 510/422, 423, 424, 427, 434, 435, 467, 510/477, 488, 499, 509, 510, 511, 512
See application file for complete search history.

(56) References Cited

U.S. PATENT DOCUMENTS

| | | | | |
|---|---|---|---|---|
| 4,683,008 A | * | 7/1987 | Betts | ................... C11D 11/0029 134/27 |
| 4,803,012 A | * | 2/1989 | Wershofen | ............... C11D 1/44 510/219 |
| 5,114,607 A | | 5/1992 | Deck et al. | |
| 5,259,993 A | | 11/1993 | Short | |
| 5,275,671 A | * | 1/1994 | Rivenaes | ................. C23G 1/24 134/40 |
| 5,308,550 A | * | 5/1994 | Friloux | .................... C11D 3/43 510/161 |
| 5,534,199 A | * | 7/1996 | Winkler, III | ............. C11D 1/94 134/42 |
| 5,663,132 A | | 9/1997 | Talley | |
| 5,670,469 A | * | 9/1997 | Dingus | .................... C11D 3/18 106/31.94 |
| 5,789,361 A | | 8/1998 | Talley | |
| 5,863,345 A | | 1/1999 | Talley | |
| 5,898,024 A | | 4/1999 | Talley | |
| 6,034,048 A | | 3/2000 | Talley | |
| 6,043,207 A | | 3/2000 | Talley | |
| 6,194,367 B1 | | 2/2001 | Talley | |
| 6,310,024 B1 | * | 10/2001 | Gill | ........................... C02F 1/70 510/218 |
| 6,521,578 B1 | * | 2/2003 | Stute | ........................ C11D 1/94 510/191 |
| 6,624,132 B1 | * | 9/2003 | Man | ....................... C11D 3/046 510/321 |
| 7,553,806 B2 | * | 6/2009 | Man | ....................... C11D 3/046 510/337 |

(Continued)

FOREIGN PATENT DOCUMENTS

WO    2005019399 A1    3/2005

OTHER PUBLICATIONS

Mansoori, G. Ali, "Modeling of Asphaltene and Other Heavy Organic Depositions," Journal of Petroleum Science and Engineering 17 (1997) 101-111.
Buckley, Jill S., "Evaluation of Reservoir Wettability and its Effect on Oil Recovery," First Annual Report, reporting period: Jul. 1, 1996-Jun. 30, 1997, prepared for U.S. Department of Energy.
PCT International Searching Authority/US, International Search Report, mailed Nov. 27, 2015, for PCT/US2015/046923, "Aqueous Cleaning Composition and Method."

(Continued)

*Primary Examiner* — Gregory R Delcotto
(74) *Attorney, Agent, or Firm* — Jones Walker LLP

(57) ABSTRACT

An aqueous cleaning composition for removing paraffin, asphaltene, and scale deposits or plugs from a hydrocarbon system. The aqueous cleaning composition is formed of a cleaning composition and an aqueous liquid. The cleaning composition contains about 21-33% of a silicate, about 20-35% of a peroxygen, about 3-15% of a phosphate, about 15-40% of a carbonate or bicarbonate, about 1-10% of a chelating agent, about 1-5.5% of a surfactant combination. In one embodiment, the surfactant combination includes a surfactant polymer mixture containing a block polymer and a reverse polymer, and a wetting agent containing a sulfonated material or an ethoxylated alcohol.

3 Claims, No Drawings

(56) References Cited

U.S. PATENT DOCUMENTS

| | | | | |
|---|---|---|---|---|
| 8,293,699 B2* | 10/2012 | Futterer | ................. | C11D 3/361 510/130 |
| 2003/0096726 A1* | 5/2003 | Smith | ...................... | C11D 1/65 510/424 |
| 2003/0181349 A1* | 9/2003 | Maeno | ..................... | C11D 1/72 510/499 |
| 2004/0214741 A1* | 10/2004 | Liss | ........................ | C11D 1/66 510/421 |
| 2005/0126784 A1 | 6/2005 | Dalton | | |
| 2005/0181966 A1 | 8/2005 | Micciche et al. | | |
| 2007/0082834 A1* | 4/2007 | Hudson | ............. | C11D 17/0021 510/407 |
| 2009/0233837 A1* | 9/2009 | Futterer | ................. | C11D 1/342 510/300 |
| 2009/0313772 A1 | 12/2009 | Talley | | |
| 2010/0263693 A1* | 10/2010 | Mathur | .................... | C11D 3/43 134/40 |
| 2011/0301072 A1* | 12/2011 | Smith | .................... | C11D 3/046 510/227 |
| 2012/0149623 A1* | 6/2012 | Li | ........................... | C09G 1/16 510/214 |
| 2012/0202729 A1 | 8/2012 | Bourdette | | |
| 2013/0210692 A1* | 8/2013 | Gutowski | ............ | C11D 3/3749 510/219 |

OTHER PUBLICATIONS

PCT International Searching Authority/US, Written Opinion of the International Searching Authority, mailed Nov. 27, 2015, for PCT/US2015/046923, "Aqueous Cleaning Composition and Method."

\* cited by examiner

AQUEOUS CLEANING COMPOSITION AND METHOD

BACKGROUND

Paraffin wax and asphaltene deposition costs the oil industry billions of dollars worldwide. Paraffin and asphaltene precipitation and deposition in crude oil transport flow-lines and pipelines is an increasing challenge for the development of deep-water subsea hydrocarbon reservoirs. When sufficiently deposited over time, paraffin wax and asphaltenes can partially or totally block oil production to uneconomical levels requiring shutdowns or various remediation treatments. Other problems caused by paraffin or asphaltene deposition include entrapment of produced water, which increases surface roughness on pipe walls leading to increased pumping pressure and reduced throughput, accumulations that fill process vessels and storage tanks, and interference with the operation of valves and other instrumentation. This deposition also occurs in producing wells where the paraffin and asphaltene deposits accumulate in and around the wellbore causing major restrictions. All of these problems may result in production shutdowns and hazardous conditions requiring extensive workovers, and resulting in production losses and possibly irreparable damage to equipment.

A plethora of thermal, chemical, and mechanical measures are available to manage these types of depositions on either a preventative basis (i.e., mitigation of deposition) or a remediate basis (i.e., removal of deposits). Typical deposition management systems include chemical inhibitors and the implementation of operations such as line heating, solvent circulation and, in shorter lines, mechanical scraping. But mechanical scraping processes (e.g., coiled tubing) are limited by their ability to only travel short distances, are costly, and involve significant risks. Additionally, solvents (e.g., xylene or toluene mixed with either diesel or kerosene) require heat to significantly increase paraffin and asphaltene solubility. The subsea temperatures dissipate the necessary heat quickly, rendering the solvents ineffective. This decreased efficiency of solvents results in the requirement for larger treatment volumes, longer treatment times, and ultimately a high cost. These solvents are also environmentally unfriendly.

It is commonly believed that paraffin wax is formed of molecules in the range of $C_{20}$ and higher. However, due to pressure differences and very low temperatures inside and around subsea flow lines, these paraffin wax deposits begin to form with much smaller carbon chains. Since average subsea temperatures are below 40° F., paraffin compounds such as tridecane ($C_{13}$, which freezes at 27° F.), tetradecane ($C_{14}$, which freezes at 41.9° F.), pentadecane ($C_{15}$, which freezes at 49.8° F.), and hexadecane ($C_{16}$, which freezes at 64° F.) also begin to deposit on these flow lines as wax deposits. These paraffinic compounds all display only limited solubility at modest temperatures in many types of organic solvents and are virtually insoluble in aqueous solutions, although they can be re-melted between 120-150° F.

Asphaltene deposition is less driven by temperature and pressure. Instead, the deposition of asphaltenes is affected more by chemical changes in the crude oil. Asphaltene molecules are dispersed or floating in the crude oil. Lowering the pH of the system or introducing carbon dioxide or nonaromatic solvents can strip away the outer parts of the asphaltene molecules, which help to maintain dispersion of the asphaltene molecules. Without the outer parts, the asphaltene molecules will flocculate and precipitate.

Scale formation in natural gas pipelines may be attributed to a number of factors. Evaluation of scale samples indicate that the scale formations may include trace amounts of silica and clay from the formations from which the gas was derived, along with black powders and mineral scales. These scale formations may be very hard and may resemble sand stone. The use of monoethanol glycol (MEG) or methanol to retard the formation of natural gas hydrates has created the problem of decreased solubility of trace minerals. Additionally, basic agents (e.g., NaOH or $NaHCO_3$) may be added to the MEG stream to increase pH for preventing corrosion. The increased pH, however, leads to decreased solubility of carbonate salts. Possible sources of the black powder include mill scale from the pipe manufacturing process, flash rust from hydraulic test water corrosion, and internal pipe corrosion. Chemical analyses of the black powder show that it consists mainly of a mixture of iron oxides and iron sulfides.

DETAILED DESCRIPTION OF SELECTED EMBODIMENTS

An aqueous cleaning fluid has been developed for removing deposits of paraffin wax, asphaltene molecules, and scale from hydrocarbon flow lines, vessels, or other equipment. A granular cleaning composition may be activated with an aqueous liquid, such as sea water or produced water, to form the aqueous cleaning fluid. The effectiveness of the aqueous cleaning fluid is temperature independent. These properties render the cleaning composition ideal for offshore and subsea pipeline operations.

The cleaning composition lowers surface tension allowing it to penetrate the area between a deposited material and a pipe wall. The cleaning composition also neutralizes the zeta charge associated with paraffin and asphaltene molecules, which reduces the stickiness of the deposit and reduces the ability of these molecules to adhere to a pipe wall, other molecules, or geological formations. In this way, the cleaning composition allows the paraffin and asphaltene molecules to be removed from the deposit.

The cleaning composition may include the following components: a silicate, a peroxygen, a phosphate, a carbonate or a bicarbonate, a chelating agent, and a surfactant combination. The cleaning composition may be mixed with an aqueous liquid to form an aqueous cleaning fluid. Suitable aqueous liquids include, but are not limited to, water, aqueous brines, sea water, lake water, river water, subsurface water, produced water, or any mixture thereof. The concentration of the cleaning composition in the aqueous cleaning fluid may be about 1% to about 10% by weight. All percentages disclosed herein are weight percentages unless otherwise specified.

The silicate of the cleaning composition may include sodium metasilicate, sodium sesqui-silicate, a liquid sodium silicate, a liquid potassium silicate, or an orthosilicate. If sodium metasilicate is used, its ratio of $SiO_2/Na_2O$ may be about 1:1. The silicate may provide a soil suspending property and a corrosion inhibition property to the cleaning composition. Additionally, the silicate may help to attack $C_{13}$-$C_{18}$ paraffins that have free fatty acid radicals, which are normally aromatic in nature, through saponification. The concentration of the silicate in the cleaning composition may be about 21% to about 33% by weight. Preferably, the concentration of the silicate in the cleaning composition may be about 30% by weight.

The peroxygen of the cleaning composition may include a percarbonate (e.g., sodium percarbonate), a perborate (e.g., sodium perborate), a hydrogen peroxide, a persulfate, a thiourea dioxide, a diethylhydroxylamine, a peracetic acid, or urea peroxide (carbamide peroxide). These materials neutralize the zeta charge associated with crude oil, which causes molecules in the oil to stick to a formation or to pipe walls. Additionally, these materials release oxygen slowly. At 150° F., these materials will take about 8 hours to fully expend all of their oxygen. This slow-release of oxygen is critical when the cleaning composition must penetrate thousands of feet of paraffin/asphaltene deposition. The slow-release of oxygen is also critical when working under pressurized conditions, as the combination of oil and oxygen under pressure can be very dangerous. The concentration of the peroxygen in the cleaning composition may be about 20% to about 35% by weight. Preferably, the concentration of the peroxygen in the cleaning composition may be about 30% by weight.

The phosphate of the cleaning composition may include sodium tripolyphosphate, tetrapotassium pyrophosphate, sodium hexametaphosphate, sodium acid pyrophosphate, tetrasodium pyrophosphate, trisodium phosphate, disodium phosphate, or monosodium phosphate. These materials may provide protection against humidity degradation of the cleaning composition. These materials are also good water conditions and help in lowering surface tension. The phosphate may help to suspend particulates and hold them in suspension. The concentration of the phosphate in the cleaning composition may be about 3% to about 15% by weight. Preferably, the concentration of the phosphate in the cleaning composition may be about 7.5% by weight.

The carbonate or the bicarbonate of the cleaning composition may include sodium carbonate, sodium bicarbonate, sodium sesqui-carbonate, potassium bicarbonate, or potassium carbonate. These materials provide further alkalinity for the saponification of the shorter chain paraffins that contain a fatty acid radical. The concentration of the carbonate or bicarbonate in the cleaning composition may be about 15% to about 40% by weight. Preferably, the concentration of the carbonate or bicarbonate in the cleaning composition may be about 25% by weight.

The chelating agent of the cleaning composition may include ethylene diamine tetra acidic acid tetra sodium salt (EDTA) or organophosphates such as HEDP, PBTC, and ATMP. The concentration of the chelating agent in the cleaning composition may be about 1% to about 10% by weight depending on the amount of iron and other trace metals in the system. Preferably, the concentration of the chelating agent in the cleaning composition may be about 5% to about 8% by weight.

The surfactant combination in the cleaning composition may include a surfactant polymer mixture and a wetting agent. The surfactant combination may have a surfactant polymer mixture to wetting agent ratio of about 1:1 to about 1:1.9. Preferably, the surfactant polymer mixture to the wetting agent ratio may be about 1:1.5. Each of the surfactants in the surfactant combination may be compatible with oxidizing materials, thereby preventing the oxygen from attacking the surfactant instead of the materials intended to be removed from a formation. Reaction of oxygen with the hydrated surfactants in the blended cleaning composition is also avoided in order to prevent product degradation and possible fires.

The surfactant polymer mixture may contain an equal amount of a block polymer and a reverse polymer. In one embodiment, the surfactant polymer mixture contains an ethylene oxide/propylene oxide block copolymer (available under the trade name Pluronic L-61) and an ethylene oxide/propylene oxide reverse polymer (available under the trade name Pluronic 25R2). Alternatively, the surfactant polymer mixture may contain ethoxylated triglyceride, polyglyceryl-2-sequilisosterate, polyethylene glycol stearate, a monoglyceride, or a diglyceride. These polymer surfactants are nonionic and have hydrophilic-lipophilic balance (HLB) values between 3 and 6 indicating that they are water-in-oil emulsifiers. They function as both rinse aids (i.e., allowing water to form sheets rather than spots by reducing the surface tension of water) and anti-redeposition agents (i.e., preventing soils from depositing on surfaces). The concentration of the surfactant polymer mixture in the cleaning composition may be about 0.6% to about 2% by weight. Preferably, the concentration of the surfactant polymer mixture in the cleaning composition may be about 1% by weight.

The wetting agent of the surfactant combination may include a sulfonated material, such as a sodium alkane sulfonate (available under the trade name Bio Terg PAS 8S), a branched $C_{12}$ diphenyl oxide disulfide, a linear $C_{10}$ diphenyl oxide disulfonate, a sodium alpha olefin sulfonate, or a sodium ($C_{14-16}$) olefin sulfonate. These sulfonated materials are anionic and function as surface tension reducing agents. Alternatively, the wetting agent may include an ethoxylated alcohol containing a linear ($C_9/C_{10}/C_{11}$) blend, a linear $C_{11}$, a linear ($C_{12}/C_{13}$) blend, a linear ($C_{12}/C_{13}/C_{14}/C_{15}$) blend, or a linear ($C_{14}/C_{15}$) blend. These ethoxylated alcohols are nonionic and have HLB values between 7 and 9 providing excellent wetting properties as well as suspending and emulsifying properties. The concentration of the wetting agent in the cleaning composition may be about 0.5% to about 2% by weight. Preferably, the concentration of the wetting agent in the cleaning composition may be about 1.5% by weight.

The surfactant combination of the cleaning composition may further include an ethoxy phosphate, such as a linear alcohol ethoxy phosphate (available under the trade name Rhodafac PL-6), a branched alcohol ethoxy phosphate, or nonylphenol ethoxy phosphate (available under the trade name Rhodafac RS-610). These materials are anionic and provide excellent surface tension reduction as well as emulsifying properties. The ethoxy phosphate provides the ability to not only travel between a paraffin/asphaltene formation and a pipe wall, but also to penetrate the formation itself, thereby breaking the paraffin from the asphaltene and emulsifying the two materials. The concentration of the ethoxy phosphate in the cleaning composition may be about 0.4% to about 1.5% by weight. Preferably, the concentration of the ethoxy phosphate in the cleaning composition may be about 1% by weight.

The petroleum industry traditionally uses solvents (e.g., toluene, xylene, mixtures thereof or mixtures with diesel or kerosene) in attempts to remove paraffin, asphaltene, and scale deposits from hydrocarbon systems. It was unexpected that any non-solvent cleaning product could sufficiently remove these deposits from a hydrocarbon system, especially at subsea temperatures. However, the specific surfactant combination allows the aqueous cleaning fluid disclosed herein to remove paraffin, asphaltene, and scale deposits from a hydrocarbon system without the use of solvents and at temperatures as low as 33° F., such as subsea temperatures, or as high as 250° F. The aqueous cleaning fluid is able to travel extremely long distances through systems with heavy deposits.

In an alternate embodiment, the surfactant combination may include an amphoteric surfactant and an ethoxylated fatty amine. The amphoteric surfactant may include equal amounts of a disodium cocoampho dipropionate (available under the trade name Miranol FBS) and a sulfonated caprylic derivative sodium salt (available under the trade name Miranol JS Concentrate). The concentration of the amphoteric surfactant in the cleaning composition may be about 0.6% to about 2% by weight. Preferably, the concentration of the amphoteric surfactant in the cleaning composition may be about 1% by weight. The ethoxylated fatty amine may include polyoxyethylene tallow amine (available under the trade name Ethox TAM-5). This material may function as an emulsifier and a releasing agent in the cleaning composition. In this embodiment, the surfactant combination provides the aqueous cleaning fluid with the ability to remove microorganisms that create partial or complete plugs in a hydrocarbon flow line. The concentration of the ethoxylated fatty amine in the cleaning composition may be about 0.5% to about 2% by weight. Preferably, the concentration of the ethoxylated fatty amine in the cleaning composition may be about 1.5% by weight.

Tests conducted on the aqueous cleaning fluid containing 1% of the cleaning composition showed the surface tension to be about 27 dynes without the help of surfactants, which was attributed to the phosphate and the EDTA. The surface tension of only the surfactant combination was found to be about 22 dynes. The surface tension of the cleaning composition may be 28 dynes or less. More preferably, the surface tension of the cleaning composition may be 24 dynes or less. Most preferably, the surface tension of the cleaning composition may be 22 dynes or less. The cleaning composition may have a $Na_2O$ mEq value of at least about 20 mEq values at a pH of about 9, more preferably about 25 mEq, and most preferably about 35 mEq at a pH of 12.

With a pump or agitator running at sufficient speed, the granular cleaning composition may be added to an aqueous liquid. Slow addition of the cleaning composition in a back and forth motion may eliminate clumping and excessive mixing times. After the desired amount of the cleaning composition has been added, the aqueous cleaning fluid may be allowed to mix thoroughly to ensure that all granulated material is properly dissolved. In one embodiment, the aqueous cleaning fluid may be heated to decrease the mixing time. Heating, however, is not necessary.

The aqueous cleaning fluid may be used to remove a deposit or plug in a system such as, but not limited to, an oil or gas pipeline or wellbore, either subsea or on land. The aqueous cleaning fluid is effective at removing deposits formed of hydrocarbons or scale. Hydrocarbons include, but are not limited to, crude oil, shale oil, tar, asphaltene, and paraffin. Scale includes, but is not limited to, any carbonate, sulfate, or metal salt that has precipitated out of the water phase, trace formation material such as silica and clays, and corrosion materials.

If the system is completely blocked by the deposit or plug, the aqueous cleaning fluid may be pumped at a slow rate through the system. Where production fluid is present in the system, the heavier aqueous cleaning fluid may replace the lighter production fluid in the system. The production fluid may be collected in an appropriate container for disposal or reprocessing. The pumping may continue until all of the production fluid has been displaced as evidenced by the return of the aqueous cleaning fluid. A valve on a line used to displace and capture the production fluid may be closed, and additional aqueous cleaning fluid may be pumped into the system until a desired line pressure is reached. Once this desired line pressure is achieved, the pumping of the aqueous cleaning fluid is stopped. The aqueous cleaning fluid may penetrate between the deposit and the system wall (e.g., pipe wall), as well as through the deposit itself. As this penetration occurs, the line pressure will decrease. Additional amounts of the aqueous cleaning fluid may be pumped into the system to maintain the desired line pressure. The line pressure is used as a measurement of the effectiveness of the aqueous cleaning fluid in penetrating the deposit. When there is a sufficient decrease in the line pressure, removal of the deposit may begin. On one side of the system, a valve may be opened and a collection station may be used to collect the deposited material. On the opposite side of the system, additional aqueous cleaning fluid may be pumped into the system forcing the deposit out of the system. In another embodiment, a pig may be used to push the deposit out of the system. Once the blockage is removed, the system may be flooded with a desired concentration of the aqueous cleaning fluid and closed, allowing the aqueous cleaning fluid to soak for a minimum of 12 hours. After the desired soaking time, the line may be pigged and flushed with seawater to remove any remaining solids or sludge.

If the system is only partially blocked by the deposit or plug, the production fluid may be removed in two ways. The first way includes slowly pumping the aqueous cleaning fluid into the system, allowing the heavier aqueous cleaning fluid to displace the lighter production fluid, and collecting the production fluid at the pumping point in the same way described above. The second way includes slowly pumping the aqueous cleaning fluid into the system to push the production fluid toward a capture point at the opposite end of the system from the pumping side. Pumping may be continued until all of the production fluid has been removed and the aqueous cleaning fluid is being returned at the capture point. The length of the system may be filled with a desired concentration of the aqueous cleaning fluid, and allowed to soak for a minimum of 12 hours. After the desired soaking time, the system may be flushed with an additional volume of the aqueous cleaning fluid to collect the contents of the line at the capture point. Pumping may continue until a sufficient amount of the aqueous cleaning fluid has been added to the system. The line may be closed and allowed to soak for a minimum of 12 hours. After the desired secondary soak time period, the line may be pigged. If the line pressure decreases, an additional amount of the aqueous cleaning fluid may be added to maintain the desired line pressure. This process may be continued until the deposit or blockage is removed and communication is established. Then the line may be flooded with a desired concentration of the aqueous cleaning fluid. The system may be closed and allowed to soak again for a minimum of 12 hours. After the desired third soak time period, the line may be pigged and flushed with seawater to remove any remaining solids or sludge.

Example 1

A cleaning composition was prepared with the components shown in Table 1. Test Well 1 was at static pressure and producing only ¼ barrel of oil per day. Fifty pounds of the cleaning composition was poured directly into the annulus of Test Well 1 followed by 10 barrels (420 gallons) of produced water to form an aqueous cleaning fluid in the annulus. The aqueous cleaning fluid was allowed to soak in the annulus for 24 hours. After reassembly, the aqueous cleaning fluid was pumped out and processed through a tank battery. After treatment with the aqueous cleaning fluid, the production rate of Test Well 1 increased to 4 barrels of oil per day. Test Well 1 continued at this production rate for a period of 8 months.

TABLE 1

| | |
|---|---|
| Sodium metasilicate, anhydrous | 30.3% |
| Sodium percarbonate | 30.3% |
| Sodium tripolyphosphate | 6.7% |
| Sodium carbonate, dense | 23.6% |
| EDTA | 6.7% |
| Ethylene oxide/propylene oxide block copolymer (Pluronic L-61) | 0.4% |
| Ethylene oxide/propylene oxide reverse polymer (Pluronic 25R2) | 0.4% |
| Sodium alkane sulfonate (Bio Terg PAS 8S) | 1.5% |

Example 2

A cleaning composition was prepared with the components shown in Table 2. Test Well 2 was producing only ½ barrel of oil per day. Test Well 2 was treated with the cleaning composition shown in Table 2 according to the procedure set forth in Example 1 above. After treatment with the aqueous cleaning fluid, the production rate of Test Well 2 increased to 3.5 barrels of oil per day. Test Well 2 continued at this production rate for a period of 6 months.

TABLE 2

| | |
|---|---|
| Sodium metasilicate, anhydrous | 24.7% |
| Sodium percarbonate | 30.1% |
| Sodium tripolyphosphate | 7.9% |
| Sodium carbonate, dense | 28.1% |
| EDTA | 6.7% |
| Ethylene oxide/propylene oxide block copolymer (Pluronic L-61) | 0.5% |
| Ethylene oxide/propylene oxide reverse polymer (Pluronic 25R2) | 0.5% |
| Linear alcohol ethoxy phosphate (Rhodafac PL-6) | 1.5% |

Example 3

A cleaning composition was prepared with the components shown in Table 3. Test Well 3 was producing only ½ barrel of oil per day at ambient pressure. Test Well 3 was treated with the cleaning composition shown in Table 3 according to the procedure set forth in Example 1 above. After treatment with the aqueous cleaning fluid, the production rate of Test Well 3 increased to 10 barrels per day, with a renewed production of natural gas. Test Well 3 continued at this production level for a period of about 3 months. After this time, Test Well 3 dropped to a production rate of 8 barrels per day, but with continued production of natural gas. Production continued at this rate for an additional 6 months.

TABLE 3

| | |
|---|---|
| Sodium metasilicate, anhydrous | 31.5% |
| Sodium percarbonate | 30.2% |
| Sodium tripolyphosphate | 8.0% |
| Sodium carbonate, dense | 25.8% |
| EDTA | 1.0% |
| Ethylene oxide/propylene oxide block copolymer (Pluronic L-61) | 0.5% |
| Ethylene oxide/propylene oxide reverse polymer (Pluronic 25R2) | 0.5% |
| Sodium alkane sulfonate (Bio Terg PAS 8S) | 1.5% |
| Linear alcohol ethoxy phosphate (Rhodafac RS-610) | 1.0% |

Example 4

A cleaning composition was prepared with the components shown in Table 4. First, a pre-blend of the surfactants was prepared with a small amount of water. Then the remaining components were mixed and the surfactant pre-blend was added slowly and allowed to hydrate for about 15 minutes until the mixture was fluffy and try to touch. Pipeline 4 was plugged with no communication between Point A and Point B (separated by a distance of 1.43 miles) for approximately 10 months. Previous cleaning attempts on Pipeline 4 proved unsuccessful, including the use of a prior art paraffin inhibitor. The blockage was detected 469 feet from Point B and a possible blockage was detected 467 feet from Point A. An aqueous cleaning fluid was prepared using the cleaning composition shown in Table 4. The aqueous cleaning fluid was pumped into Point A of Pipeline 4 until the production fluid present in this end of Pipeline 4 was displaced and captured in an appropriate tank. Then the aqueous cleaning fluid was pumped into Point B of Pipeline 4. Communication was first established between Point A and Point B after 8 hours total pumping time and the injection of 44.5 barrels of the aqueous cleaning fluid. Full communication was established between Point A and Point B after 45 hours of pumping. Ultimately, the aqueous cleaning fluid removed 284 barrels of paraffin solids and sludge from the 8 inch pipeline. In other words, it removed a paraffin plug that occupied 72% of the 1.43 mile long pipeline between Point A and Point B.

TABLE 4

| | |
|---|---|
| Sodium metasilicate, anhydrous | 22.0% |
| Sodium percarbonate | 32.3% |
| Sodium tripolyphosphate | 7.3% |
| Sodium carbonate, dense | 14.7% |
| Sodium carbonate, light | 14.7% |
| EDTA | 5.9% |
| Ethylene oxide/propylene oxide block copolymer (Pluronic L-61) | 0.4% |
| Ethylene oxide/propylene oxide reverse polymer (Pluronic 25R2) | 0.4% |
| Sodium alkane sulfonate (Bio Terg PAS 8S) | 1.5% |
| Linear alcohol ethoxy phosphate (Rhodafac RS-610) | 0.4% |
| Water | 0.4% |

Example 5

Test Well 5 was producing no oil. The cleaning composition shown in Table 1 was used, according to the procedure set forth in Example 1. However, after the soaking time with this aqueous cleaning fluid, Test Well 5 did not begin producing oil. Further inspection revealed the presence of a microorganism. A cleaning composition with the components shown in Table 5 was then prepared. This cleaning composition was added to the annulus of Test Well 5 at a rate of 50 pounds of the cleaning composition to 5 barrels of produced water. After a 24-hour soaking time with the aqueous cleaning fluid, the well pump was able to sufficiently remove the microorganism. Test Well 5 recovered with a production rate of 2 barrels per day.

TABLE 5

| | |
|---|---|
| Sodium metasilicate, anhydrous | 24.7% |
| Sodium percarbonate | 30.1% |
| Sodium tripolyphosphate | 7.9% |
| Sodium carbonate, dense | 28.1% |
| EDTA | 6.7% |
| Disodium cocoampho dipropionate (Miranol FBS) | 0.5% |
| Sulfonated caprylic derivative sodium salt (Miranol JS Concentrate) | 0.5% |
| Polyoxyethylene tallow amine (Ethox TAM-5) | 1.5% |

The examples above show that the aqueous cleaning fluid may be used to remove blockages from wellbores and pipelines. It may also be used to remove built up paraffins and asphaltenes in sand control operations (i.e., gravel pack); to remove scale and other deposits in injection wells; to remove microorganisms blocking a wellbore; to remove Slick Water deposits remaining after completion of a Slick Water project; and to remove rust deposits, burnt carbon, amine, and other solvent residues from oil and gas platform and refinery equipment.

The aqueous cleaning fluid may also be used to flush and clean pipelines. The aqueous cleaning fluid may first penetrate bonds holding paraffin and asphaltenes in place. It may also leave a slight silica residue to assist in reducing friction and to allow the deposited materials to move freely. The aqueous cleaning fluid may also break down the asphaltenes and cap the paraffins to prevent reformation of the deposit. The combination of these effects may allow the aqueous cleaning fluid to transform a deposit or plug into a movable mass.

Hydrocarbons are usually present in mineral scale deposits found in flow lines, separators, and tubulars. The aqueous cleaning fluid may be used to remove the top layers of hydrocarbons from the mineral scale deposits and to create small pathways in the scale for mineral acids to follow. The removed hydrocarbons may migrate to the surface of the aqueous cleaning fluid. When mineral acid is poured through the aqueous cleaning fluid, an acid base neutralization occurs and the scale may be broken apart via the pathways created by the aqueous cleaning fluid. Examples of scale deposits that may be removed using the aqueous cleaning fluid include, but are not limited to, barium carbonate and barium sulfate scale deposits.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

The invention claimed is:

1. A cleaning composition for removing a deposit from a hydrocarbon system, the cleaning composition comprising:
   about 21% to about 33% of sodium metasilicate;
   about 20% to about 35% of sodium percarbonate;
   about 3% to about 15% of sodium tripolyphosphate;
   about 15% to about 40% of sodium carbonate;
   about 1% to about 10% of ethylene diamine tetra acidic tetra sodium salt;
   about 0.4% to about 1.5% of a branched alcohol ethoxy phosphate;
   about 0.6% to about 2% of a surfactant polymer mixture which is a polyethylene glycol stearate and an equal amount of an ethylene oxide/propylene oxide block polymer and an ethylene oxide/propylene oxide reverse polymer, mixed with a polyethylene glycol stearate; and
   about 0.5% to about 2% of a wetting agent which is a nonionic ethoxylated alcohol.

2. The cleaning composition of claim 1, comprising:
   about 21% to about 30% of sodium metasilicate;
   about 20% to about 30% of sodium percarbonate;
   about 3% to about 7.5% of sodium tripolyphosphate;
   about 15% to about 40% of sodium carbonate;
   about 1% to about 10% of ethylene diamine tetra acidic tetra sodium salt;
   about 0.4% to about 1.5% of the branched alcohol ethoxy phosphate;
   about 0.6% to about 2% of the surfactant polymer mixture; and
   about 0.5% to about 2% of the nonionic ethoxylated alcohol.

3. The cleaning composition of claim 1, wherein the nonionic ethoxylated alcohol comprises a linear ($C_9/C_{10}/C_{11}$) blend, a linear $C_{11}$, a linear ($C_{12}/C_{13}$) blend, a linear ($C_{12}/C_{13}/C_{14}/C_{15}$) blend, or a linear ($C_{14}/C_{15}$) blend.

* * * * *

UNITED STATES PATENT AND TRADEMARK OFFICE
CERTIFICATE OF CORRECTION

PATENT NO. : 9,637,677 B2  
APPLICATION NO. : 14/477289  
DATED : May 2, 2017  
INVENTOR(S) : Charles Bullick Talley Page 1 of 1

It is certified that error appears in the above-identified patent and that said Letters Patent is hereby corrected as shown below:

In the Claims

Claim 1 at Column 10, Line 19, delete ", mixed with a polyethylene glycol stearate"

Signed and Sealed this  
Seventh Day of May, 2019

Andrei Iancu  
*Director of the United States Patent and Trademark Office*